US006935161B2

(12) United States Patent
Hutchinson

(10) Patent No.: US 6,935,161 B2
(45) Date of Patent: Aug. 30, 2005

(54) SERVICE STATION LEAK DETECTION AND RECOVERY SYSTEM

(75) Inventor: Ray J. Hutchinson, Houma, LA (US)

(73) Assignee: Gilbarco Inc., Greensboro, NC (US)

(*) Notice: Subject to any disclaimer, the term of this patent is extended or adjusted under 35 U.S.C. 154(b) by 0 days.

(21) Appl. No.: 10/890,627

(22) Filed: Jul. 14, 2004

(65) Prior Publication Data

US 2005/0034508 A1 Feb. 17, 2005

Related U.S. Application Data

(60) Division of application No. 10/288,245, filed on Nov. 5, 2002, which is a continuation-in-part of application No. 10/173,990, filed on Jun. 18, 2002.

(51) Int. Cl.[7] .................... G01M 3/02
(52) U.S. Cl. .................... 73/40.5 R
(58) Field of Search .................... 73/40.5 R

(56) References Cited

U.S. PATENT DOCUMENTS

| | | | | | |
|---|---|---|---|---|---|
| 4,088,987 | A | | 5/1978 | Resler et al. | 340/242 |
| 4,410,109 | A | | 10/1983 | Murrell, Jr. et al. | 222/52 |
| 4,639,164 | A | * | 1/1987 | Pugnale et al. | 405/54 |
| 4,796,676 | A | | 1/1989 | Hendershot et al. | 141/83 |
| 4,805,444 | A | | 2/1989 | Webb | 73/40.5 |
| 4,871,084 | A | | 10/1989 | Robbins | 220/85 F |
| 4,932,257 | A | * | 6/1990 | Webb | 73/40.5 R |
| 4,966,190 | A | | 10/1990 | Geisinger | 137/613 |
| 4,971,477 | A | | 11/1990 | Webb et al. | 405/154 |
| 4,977,528 | A | | 12/1990 | Norris | 364/571.04 |
| 5,014,543 | A | | 5/1991 | Franklin et al. | 73/40.5 R |
| 5,027,849 | A | | 7/1991 | Diesener | 137/236.1 |
| 5,040,577 | A | | 8/1991 | Pope | 141/59 |
| 5,042,290 | A | | 8/1991 | Geisinger | 73/40.5 R |
| 5,092,158 | A | | 3/1992 | Tuma et al. | 73/3 |
| 5,098,221 | A | | 3/1992 | Osborne | 405/52 |
| 5,134,878 | A | * | 8/1992 | Sharp | 73/49.2 |
| 5,157,958 | A | | 10/1992 | Geisinger | 73/3 |
| 5,184,504 | A | | 2/1993 | Spring | 73/49.2 |
| 5,244,307 | A | | 9/1993 | Wokas | 405/53 |
| 5,257,652 | A | | 11/1993 | Lawrence | 141/86 |
| 5,263,794 | A | | 11/1993 | Webb | 405/52 |
| 5,265,652 | A | * | 11/1993 | Brunella | 141/59 |
| 5,297,896 | A | | 3/1994 | Webb | 405/52 |
| 5,301,721 | A | * | 4/1994 | Hartmann | 141/59 |
| 5,319,545 | A | | 6/1994 | McGarvey et al. | 364/403 |
| 5,343,191 | A | | 8/1994 | McAtamney | 340/605 |
| 5,383,769 | A | | 1/1995 | Williams | 417/238 |

(Continued)

OTHER PUBLICATIONS

"Red Jacket, Quantum, 4 inch Submersible Pumps, Installation, Operation, Service & Repair Parts", 1997, 36 pages.

Zui, Christopher, "Double Containment Piping System Design", Handbook of Double Containment Piping Systems, 1995, pp. 569–649.

*Primary Examiner*—Hezron Williams
*Assistant Examiner*—John Fitzgerald
(74) *Attorney, Agent, or Firm*—Withrow & Terranova, PLLC

(57) ABSTRACT

A fueling environment distributes fuel from a fuel supply to fuel dispensers in a daisy chain arrangement with a double-walled piping system. Fuel leaks that occur within the double-walled piping system are returned to the underground storage tank or a sump proximate the submersible turbine pump by the outer wall of the double-walled piping. This preserves the fuel for later use and helps reduce the risk of environmental contamination. Leak detectors may also be positioned in to fuel dispensers detect leaks and provide alarms for the operator, and help pinpoint leak detection that has occurred in the piping system proximate to a particular fuel dispenser or in between two consecutive fuel dispensers.

24 Claims, 9 Drawing Sheets

U.S. PATENT DOCUMENTS 5,390,713 A * 2/1995 Fiech ..................... 141/98
5,400,253 A 3/1995 O'Connor ..................... 364/442
5,400,646 A 3/1995 Kraus et al. ..................... 73/49.2
5,423,457 A 6/1995 Nicholas et al. ..................... 222/62
5,427,474 A 6/1995 Silvers ..................... 405/52
5,490,544 A 2/1996 Broline ..................... 141/1
RE35,238 E 5/1996 Pope ..................... 141/59
5,529,098 A 6/1996 Bravo ..................... 141/88
5,553,971 A 9/1996 Osborne ..................... 405/52
5,556,679 A * 9/1996 Booles ..................... 428/36.91
5,557,965 A 9/1996 Fiechtner ..................... 73/49.2
5,567,083 A 10/1996 Osborne ..................... 405/154
5,568,449 A 10/1996 Rountree et al. ..................... 367/99
5,586,586 A * 12/1996 Fiech ..................... 141/98
5,617,757 A 4/1997 Horner ..................... 73/290 V
5,689,061 A 11/1997 Seitter et al. ..................... 73/40.5 R
5,734,851 A 3/1998 Leatherman et al. ..................... 395/329
5,775,842 A 7/1998 Osborne ..................... 405/154
5,782,579 A 7/1998 Dupouy et al. ..................... 405/52
5,799,834 A 9/1998 Small et al. ..................... 222/148
5,831,149 A * 11/1998 Webb ..................... 73/40.5 R
5,853,113 A 12/1998 Small et al. ..................... 222/379
5,912,712 A 6/1999 Doherty ..................... 348/471
5,921,441 A 7/1999 Small et al. ..................... 222/148
5,950,872 A 9/1999 Webb ..................... 222/131
5,955,657 A * 9/1999 Bravo ..................... 73/40.5 R
5,956,259 A 9/1999 Hartsell, Jr. et al. ..................... 364/528.37
5,975,110 A * 11/1999 Sharp ..................... 137/234.6
6,006,773 A 12/1999 Bravo ..................... 137/15
6,032,699 A 3/2000 Cochran et al. ..................... 138/104
6,040,577 A 3/2000 Mauduit ..................... 250/338.1
6,052,629 A 4/2000 Leatherman et al. ..................... 700/241
6,082,392 A 7/2000 Watkins, Jr. ..................... 137/312
6,126,409 A 10/2000 Young ..................... 417/297
6,129,529 A 10/2000 Young et al. ..................... 417/423.3
6,158,460 A 12/2000 Clark et al. ..................... 137/561 A
6,170,539 B1 1/2001 Pope et al. ..................... 141/59
6,182,710 B1 2/2001 Webb ..................... 141/1
6,223,765 B1 5/2001 Small et al. ..................... 137/312
6,230,735 B1 5/2001 Bravo ..................... 137/312
6,270,285 B1 8/2001 Wokas ..................... 405/52
6,446,671 B2 9/2002 Armenia et al. ..................... 138/109
6,489,894 B2 12/2002 Berg ..................... 340/605
2002/0079016 A1 6/2002 Webb ..................... 141/2
2003/0047211 A1 3/2003 Bravo et al. ..................... 137/312
2003/0047212 A1 3/2003 Bravo et al. ..................... 137/312
2003/0230593 A1 12/2003 Hutchinson ..................... 222/1
2004/0035464 A1 2/2004 Folkers ..................... 137/312
2004/0149017 A1 8/2004 Hutchinson et al. ..................... 73/40.5 R
2004/0182136 A1 9/2004 Halla et al. ..................... 73/49.2

* cited by examiner

SERVICE STATION LEAK DETECTION AND RECOVERY SYSTEM

RELATED APPLICATIONS

The present application is a divisional of U.S. patent application Ser. No. 10/288,245, filed Nov. 5, 2002, pending, which is a continuation-in-part of U.S. patent application Ser. No. 10/173,990, filed Jun. 18, 2002, which is herein incorporated by reference in its entirety.

FIELD OF THE INVENTION

The present invention relates to a fuel recovery system for recovering leaks that occur in fuel supply piping in a retail fueling environment.

BACKGROUND OF THE INVENTION

Managing fuel leaks in fueling environments has become more and more important in recent years as both state and federal agencies impose strict regulations requiring fueling systems to be monitored for leaks. Initially, the regulations required double-walled tanks for storing fuel accompanied by leak detection for the tanks. Subsequently, the regulatory agencies have become concerned with the piping between the underground storage tank and the fuel dispensers and are requiring double-walled piping throughout the fueling environment as well.

Typically, the double-walled piping that extends between fuel handling elements within the fueling environment terminates at each end with a sump that is open to the atmosphere. In the event of a leak, the outer pipe fills and spills into the sump. The sump likewise catches other debris, such as water and contaminants, that contaminate the fuel caught by the sump, thereby making this contaminated fuel unusable. Thus, the sump is isolated from the underground storage tank, and fuel captured by the sump is effectively lost.

Coupled with the regulatory changes in the requirements for the fluid containment vessels are requirements for leak monitoring such that the chances of fuel escaping to the environment are minimized. Typical leak detection devices are positioned in the sumps. These leak detection devices may be probes or the like and may be connected to a control system for the fueling environment such that the fuel dispensing is shut down when a leak is detected.

Until now, fueling environments have been equipped with elements from a myriad of suppliers. Fuel dispensers might be supplied by one company, the underground storage tanks by a second company, the fuel supply piping by a third company, and the tank monitoring equipment by yet a fourth company. This makes the job of the designer and installer of the fueling environment harder as compatibility issues and the like come into play. Further, it is difficult for one company to require a specific leak detection program with its products. Interoperability of components in a fueling environment may provide economic synergies to the company able to effectuate such, and provide better, more integrated leak detection opportunities.

Any fuel piping system that is installed for use in a fueling environment should advantageously reduce the risk of environmental contamination when a leak occurs, and attempt to recapture fuel that leaks for reuse and reduce excavation costs, further reducing the likelihood of environmental contamination. Still further, such a system should include redundancy features and help reduce the costs of clean up.

SUMMARY OF THE INVENTION

While the parent application of the present invention capitalizes on the synergies created between the tank monitoring equipment, the submersible turbine pump (STP), and the fuel dispenser in a fueling environment, the present application supplements this disclosure by offering an alternative leaked fuel collection point. However, for continuity, the original, underlying invention is discussed first. A fluid connection that carries a fuel supply for eventual delivery to a vehicle is made between the underground storage tank and the fuel dispensers via double-walled piping. Rather than use the conventional sumps and low point drains, the present invention drains any fuel that has leaked from the main conduit of the double-walled piping back to the underground storage tank. This addresses the need to recapture the fuel for reuse and to reduce fuel that is stored in sumps which must later be retrieved and excavated by costly service personnel.

The fluid in the outer conduit may drain to the underground storage tank by gravity coupled with the appropriately sloping piping arrangements, or a vacuum may be applied to the outer conduit from the vacuum in the underground storage tank. The vacuum will drain the outer conduit. Further, the return path may be fluidly isolated from the sumps, thus protecting the fuel from contamination.

In an exemplary embodiment, the fuel dispensers are connected to one another via a daisy chain fuel piping arrangement rather than by a known main and branch conduit arrangement. Fuel supplied to a first fuel dispenser by the STP and conduit is carried forward to other fuel dispensers coupled to the first fuel dispenser via the daisy chain fuel piping arrangement. The daisy chain is achieved by a T-intersection contained within a manifold in each fuel dispenser. Fuel leaking in the double-walled piping is returned through the piping network through each downstream fuel dispenser before being returned to the underground storage tank.

The daisy chain arrangement allows for leak detection probes to be placed within each fuel dispenser so that leaks between the fuel dispensers may be detected. The multiplicity of probes causes leak detection redundancy and helps pinpoint where the leak is occurring. Further, the multiple probes help detect fuel leaks in the outer conduit of the double-walled piping. This is accomplished by verifying that fuel dispensers downstream of a detected leak also detect a leak. If they do not, a sensor has failed or the outer conduit has failed. A failure in the outer piping is cause for serious concern as fuel may be escaping to the environment and a corresponding alarm may be generated.

Another possibility with the present invention is to isolate sumps, if still present within the fuel dispenser, from this return path of captured leaking fuel such that contaminants are precluded from entering the leaked fuel before being returned to the underground storage tank. In this manner, fuel may potentially be reused since it is not contaminated by other contaminants, such as water, and reclamation efforts are easier. Since the fuel is returned to the underground storage tank, there is less danger that a sump overflows and allows the fuel to escape into the environment.

As another embodiment, and the focus of the present invention, the fuel dispensers may remain in the previously described daisy chain configuration. However, instead of returning the leaked fuel to the underground storage tank, the outer wall of the double-walled piping may terminate at the STP. The STP may capture the returned leaking fuel to a sump within the STP or, in an alternate permutation, to an external sump. In either event, the outer wall terminates prior to the underground storage tank. The leak detection processes of the parent invention are likewise useful in this embodiment. Further, a leak detection sensor may be positioned in the sump so that the sump may be serviced as needed.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
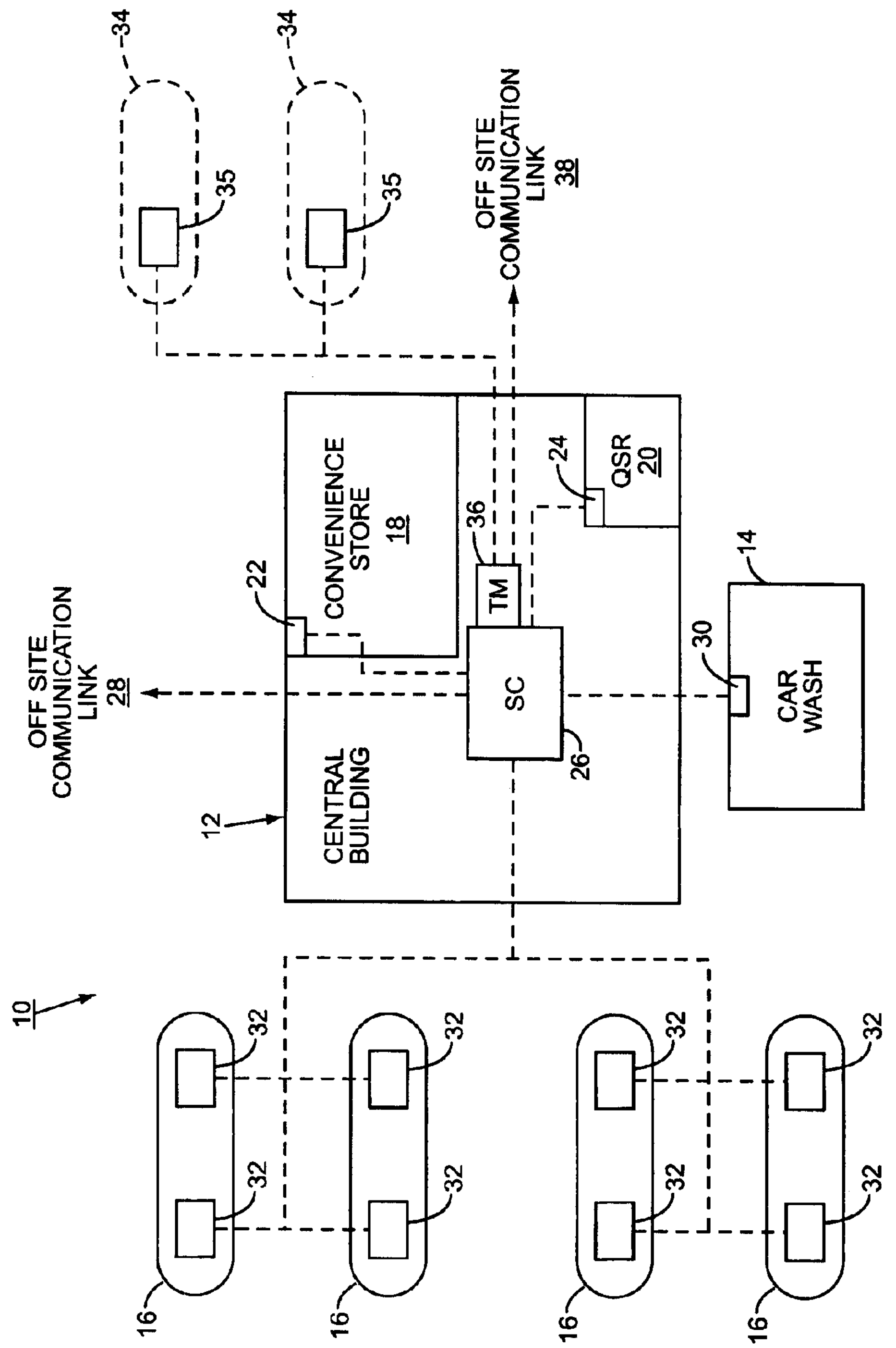
FIG. 1 PRIOR ART
FIG. 1 illustrates a conventional communication system within a fueling environment in the prior art.
Figure 2:
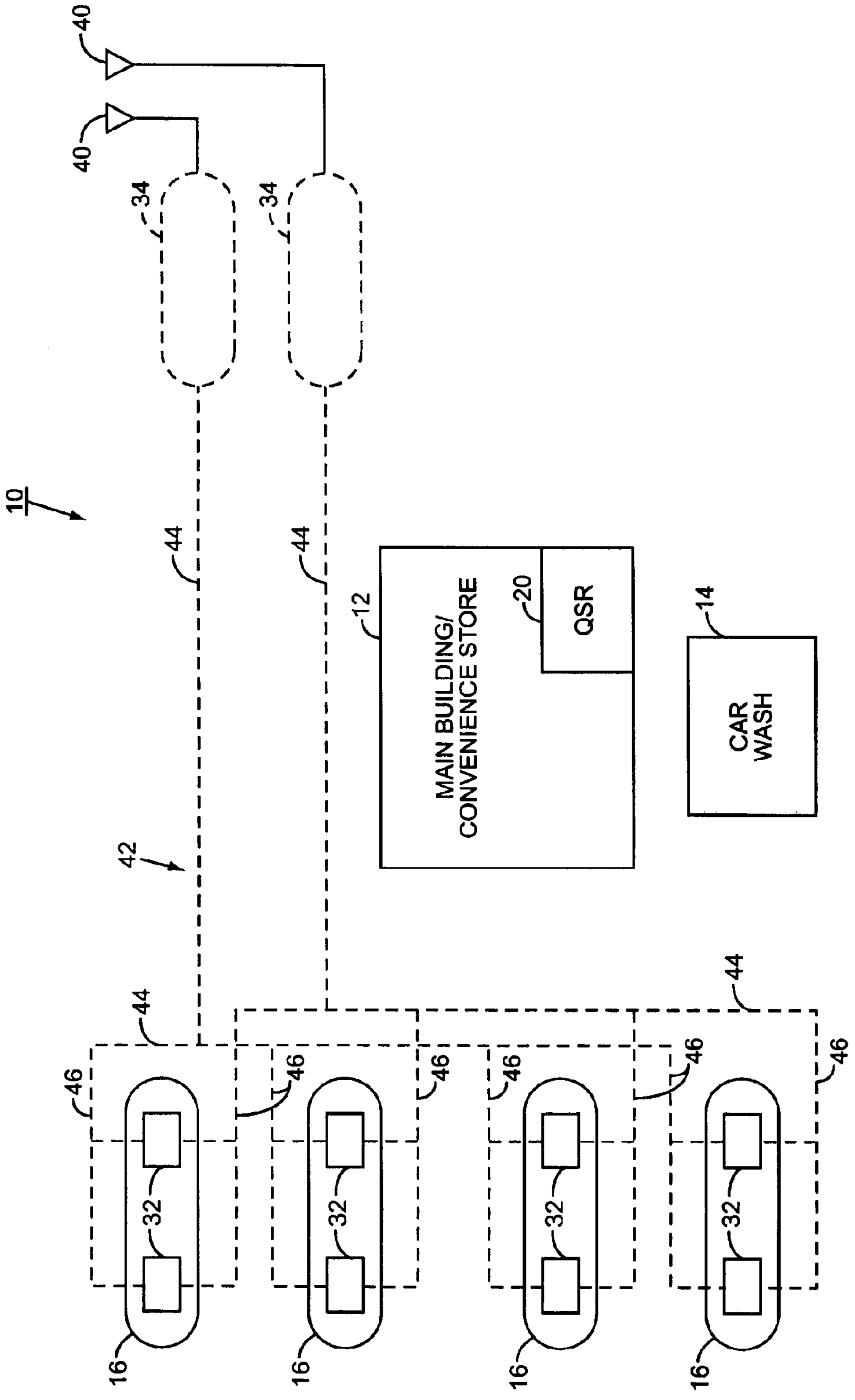
FIG. 2 PRIOR ART
FIG. 2 illustrates a conventional fueling path layout in a fueling environment in the prior art.

Fueling environments come in many different designs. Before describing the particular aspects of the parent application's invention (which begins at the description of FIG. 3), or the present invention (which begins at the description of FIG. 8), a brief description of a fueling environment follows. A conventional exemplary fueling environment 10 is illustrated in FIGS. 1 and 2. Such a fueling environment 10 may comprise a central building 12, a car wash 14, and a plurality of fueling islands 16.

The central building 12 need not be centrally located within the fueling environment 10, but rather is the focus of the fueling environment 10, and may house a convenience store 18 and/or a quick serve restaurant 20 therein. Both the convenience store 18 and the quick serve restaurant 20 may include a point of sale 22, 24, respectively. The central building 12 may further house a site controller (SC) 26, which in an exemplary embodiment may be the G-SITE® sold by Gilbarco Inc. of Greensboro, N.C. The site controller 26 may control the authorization of fueling transactions and other conventional activities as is well understood. The site controller 26 may be incorporated into a point of sale, such as point of sale 22, if needed or desired. Further, the site controller 26 may have an off site communication link 28 allowing communication with a remote location for credit/debit card authorization, content provision, reporting purposes or the like, as needed or desired. The off site communication link 28 may be routed through the Public Switched Telephone Network (PSTN), the Internet, both, or the like, as needed or desired.

The car wash 14 may have a point of sale 30 associated therewith that communicates with the site controller 26 for inventory and/or sales purposes. The carwash 14 alternatively may be a stand alone unit. Note that the car wash 14, the convenience store 18, and the quick serve restaurant 20 are all optional and need not be present in a given fueling environment.

The fueling islands 16 may have one or more fuel dispensers 32 positioned thereon. The fuel dispensers 32 may be, for example, the ECLIPSE® or ENCORE® sold by Gilbarco Inc. of Greensboro, N.C. The fuel dispensers 32 are in electronic communication with the site controller 26 through a LAN or the like.

The fueling environment 10 also has one or more underground storage tanks 34 adapted to hold fuel therein. As such, the underground storage tank 34 may be a double-walled tank. Further, each underground storage tank 34 may include a liquid level sensor or other sensor 35 positioned therein. The sensors 35 may report to a tank monitor (TM) 36 associated therewith. The tank monitor 36 may communicate with the fuel dispensers 32 (either through the site controller 26 or directly, as needed or desired) to determine amounts of fuel dispensed, and compare fuel dispensed to current levels of fuel within the underground storage tanks 34 to determine if the underground storage tanks 34 are leaking. In a typical installation, the tank monitor 36 is also positioned in the central building 12, and may be proximate the site controller 26.

The tank monitor 36 may communicate with the site controller 26 and further may have an off site communication link 38 for leak detection reporting, inventory reporting, or the like. Much like the off site communication link 28, off-site communication link 38 may be through the PSTN, the Internet, both, or the like. If the off site communication link 28 is present, the off site communication link 38 need not be present and vice versa, although both links may be present if needed or desired. As used herein, the tank monitor 36 and the site controller 26 are site communicators to the extent that they allow off site communication and report site data to a remote location.

For further information on how elements of a fueling environment 10 may interact, reference is made to U.S. Pat. No. 5,956,259, which is hereby incorporated by reference in its entirety. Information about fuel dispensers may be found in commonly owned U.S. Pat. Nos. 5,734,851 and 6,052,629, which are hereby incorporated by reference in their entirety. Information about car washes may be found in commonly owned U.S. Patent Application Ser. No. 60/380,111, filed 6 May 2002, entitled IMPROVED SERVICE STATION CAR WASH, which is hereby incorporated by reference in its entirety. An exemplary tank monitor 36 is the TLS-350R manufactured and sold by Veeder-Root. For more information about tank monitors 36 and their operation, reference is made to U.S. Pat. Nos. 5,423,457; 5,400,253; 5,319,545; and 4,977,528, which are hereby incorporated by reference in their entireties.

In addition to the various conventional communication links between the elements of the fueling environment 10, there are conventional fluid connections to distribute fuel about the fueling environment as illustrated in FIG. 2. Underground storage tanks 34 may each be associated with a vent 40 that allows over-pressurized tanks to relieve pressure thereby. A pressure valve (not shown) is placed on the outlet side of each vent 40 to open to atmosphere when the underground storage tank 34 reaches a predetermined pressure threshold. Additionally, under-pressurized tanks may draw air in through the vents 40. In an exemplary embodiment, two underground storage tanks 34 exist—one a low octane tank (87) and one a high octane tank (93). Blending may be performed within the fuel dispensers 32 as is well understood to achieve an intermediate grade of fuel. Alternatively, additional underground storage tanks 34 may be provided for diesel and/or an intermediate grade of fuel (not shown).

Pipes 42 connect the underground storage tanks 34 to the fuel dispensers 32. Pipes 42 may be arranged in a main conduit 44 and branch conduit 46 configuration, where the main conduit 44 carries the fuel to the branch conduits 46, and the branch conduits 46 connect to the fuel dispensers 32. Typically, pipes 42 are double-walled pipes comprising an inner conduit and an outer conduit. Fuel flows in the inner conduit to the fuel dispensers, and the outer conduit insulates the environment from leaks in the inner conduit. For a better explanation of such pipes and concerns about how they are connected, reference is made to Chapter B13 of PIPING HANDBOOK, $7^{th}$ edition, copyright 2000, published by McGraw-Hill, which is hereby incorporated by reference.

In a typical service station installation, leak detection may be performed by a variety of techniques, including probes and leak detection cables. More information about such devices can be found in the previously incorporated PIPING HANDBOOK. Conventional installations do not return to the underground storage tank 34 fuel that leaks from the inner conduit to the outer conduit, but rather allow the fuel to be captured in low point sumps, trenches, or the like, where the fuel mixes with contaminants such as dirt, water and the like, thereby ruining the fuel for future use without processing.

While not shown, vapor recovery systems may also be integrated into the fueling environment 10 with vapor recovered from fueling operations being returned to the underground storage tanks 34 via separate vapor recovery lines (not shown). For more information on vapor recovery systems, the interested reader is directed to U.S. Pat. Nos. 5,040,577; 6,170,539; and Re. 35,238; and U.S. patent application Ser. No. 09/783,178 filed 14 Feb. 2001, all of which are hereby incorporated by reference in their entireties.

Figure 3:
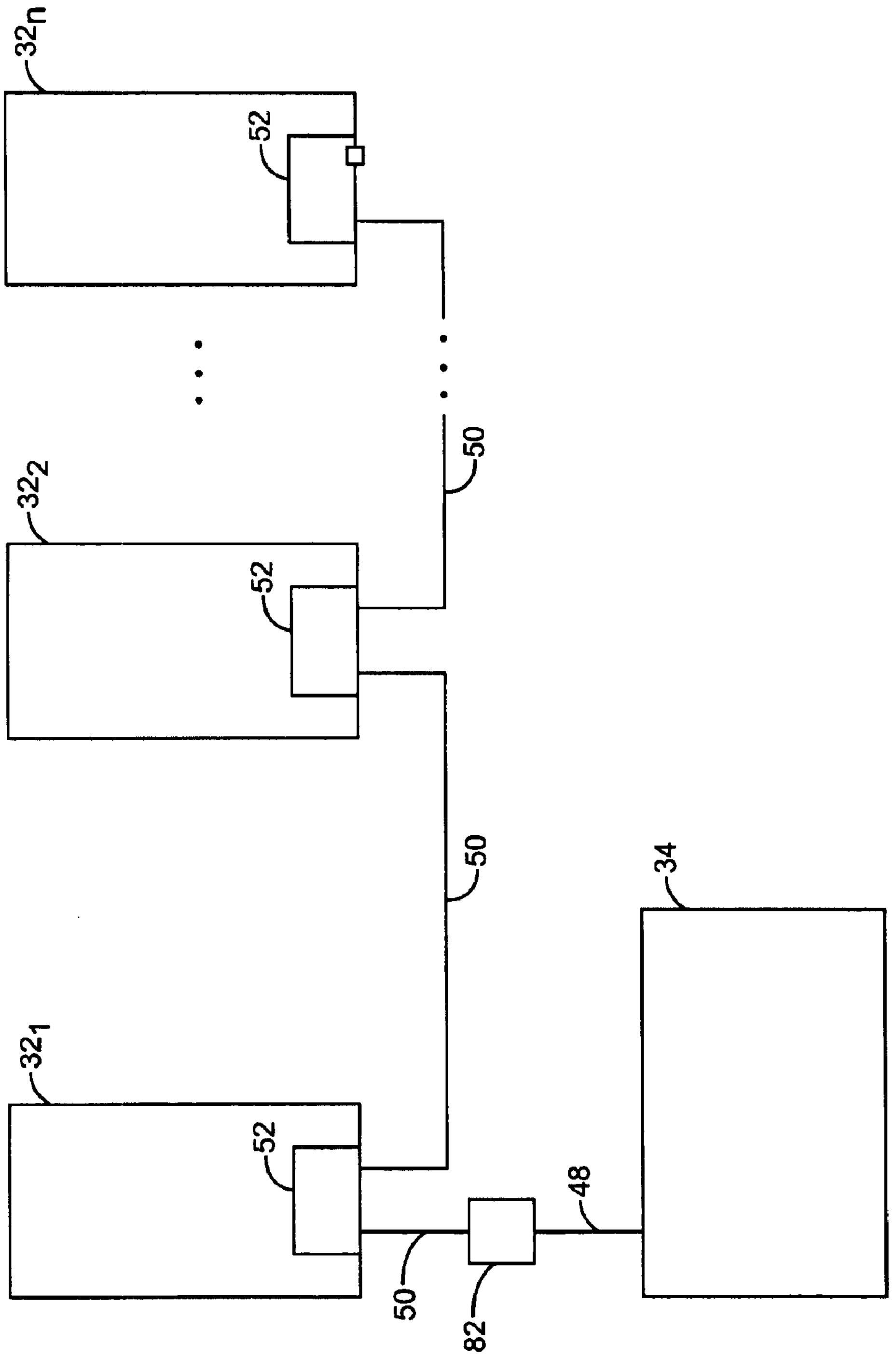
FIG. 3 illustrates, according to an exemplary embodiment of the present invention, a daisy chain configuration for a fueling path in a fueling environment.

Now turning to the invention of the parent application, the main and branch supply conduit arrangement of FIG. 2 is replaced by a daisy chain fuel supply arrangement as illustrated in FIG. 3. The underground storage tank 34 provides a fuel delivery path to a first fuel dispenser $\mathbf{32}_1$ via a double-walled pipe 48. The first fuel dispenser $\mathbf{32}_1$ is configured to allow the fuel delivery path to continue onto a second fuel dispenser $\mathbf{32}_2$ via a daisy chaining double-walled pipe 50. The process repeats until an nth fuel dispenser $\mathbf{32}^n$ is reached. Each fuel dispenser 32 has a manifold 52 with an inlet aperture and an outlet aperture as will be better explained below. In the nth fuel dispenser $\mathbf{32}_n$, the outlet aperture is terminated conventionally as described in the previously incorporated PIPING HANDBOOK.

Figure 4:
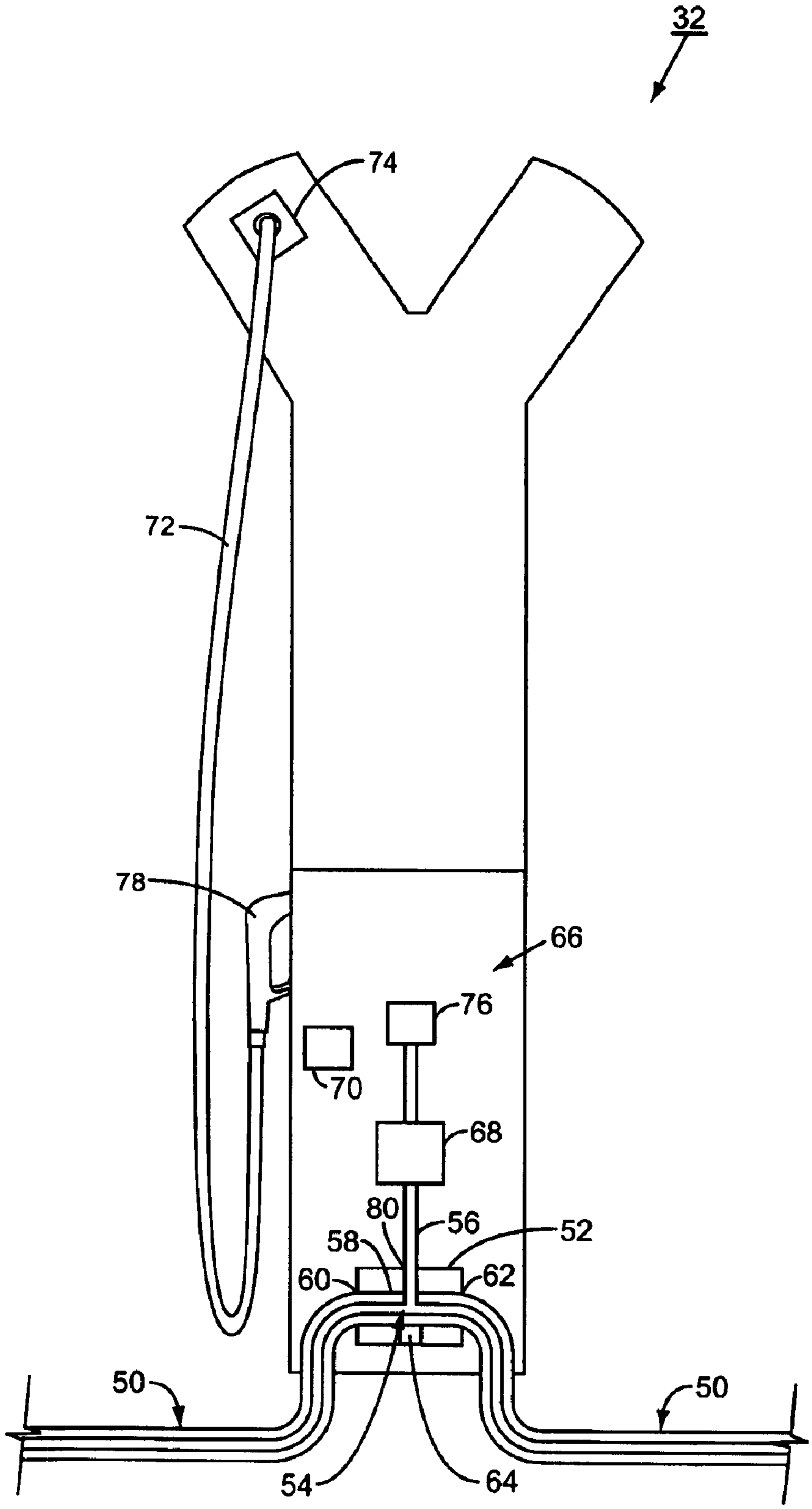
FIG. 4 illustrates, according to an exemplary embodiment of the present invention, a fuel dispenser.

As better illustrated in FIG. 4, each fuel dispenser 32 comprises a manifold 52 with a T-intersection 54 housed therein. The T-intersection 54 allows the fuel line conduit 56 to be stubbed out of the daisy chaining double-walled pipe 50 and particularly to extend through the outer wall 58 of the daisy chaining double-walled pipe 50. This T-intersection 54 may be a conventional T-intersection such as is found in the previously incorporated PIPING HANDBOOK. The manifold 52 comprises the aforementioned inlet aperture 60 and outlet aperture 62. While shown on the sides of the manifold 52's housing, these apertures could equivalently be on the bottom side of the manifold 52, if desired. Please note that the present invention is not limited to a manifold 52 with a T-joint, and that any other suitable configuration may be used that allows fuel to be supplied to a fuel dispenser 32 and allows the fuel to continue on as well to the next fuel dispenser 32 until the last fuel dispenser 32 is reached.

A leak detection probe 64 may also be positioned within the manifold 52. This leak detection probe 64 may be any appropriate liquid detection sensor as needed or desired. The fuel dispenser 32 has conventional fuel handling components 66 associated therewith, such as a fuel pump 68, a vapor recovery system 70, a fueling hose 72, a blender 74, a flow meter 76, and a fueling nozzle 78. Other fuel handling components 66 may also be present as is well understood in the art.

With this arrangement, the fuel may flow into the fuel dispenser 32 in the fuel line conduit 56, passing through the inlet aperture 60 of the manifold 52. A check valve 80 may be used if needed or desired as is well understood to prevent fuel from flowing backwards. The fuel handling components 66 draw fuel through the check valve 80 and into the handling area of the fuel dispenser 32. Fuel that is not needed for that fuel dispenser 32 is passed through the manifold 52 upstream to the other fuel dispensers 32 within the daisy chain. A sump (not shown) may still be associated with the fuel dispenser 32, but it is fluidly isolated from the daisy chaining double-walled pipe 50.

Figure 5:
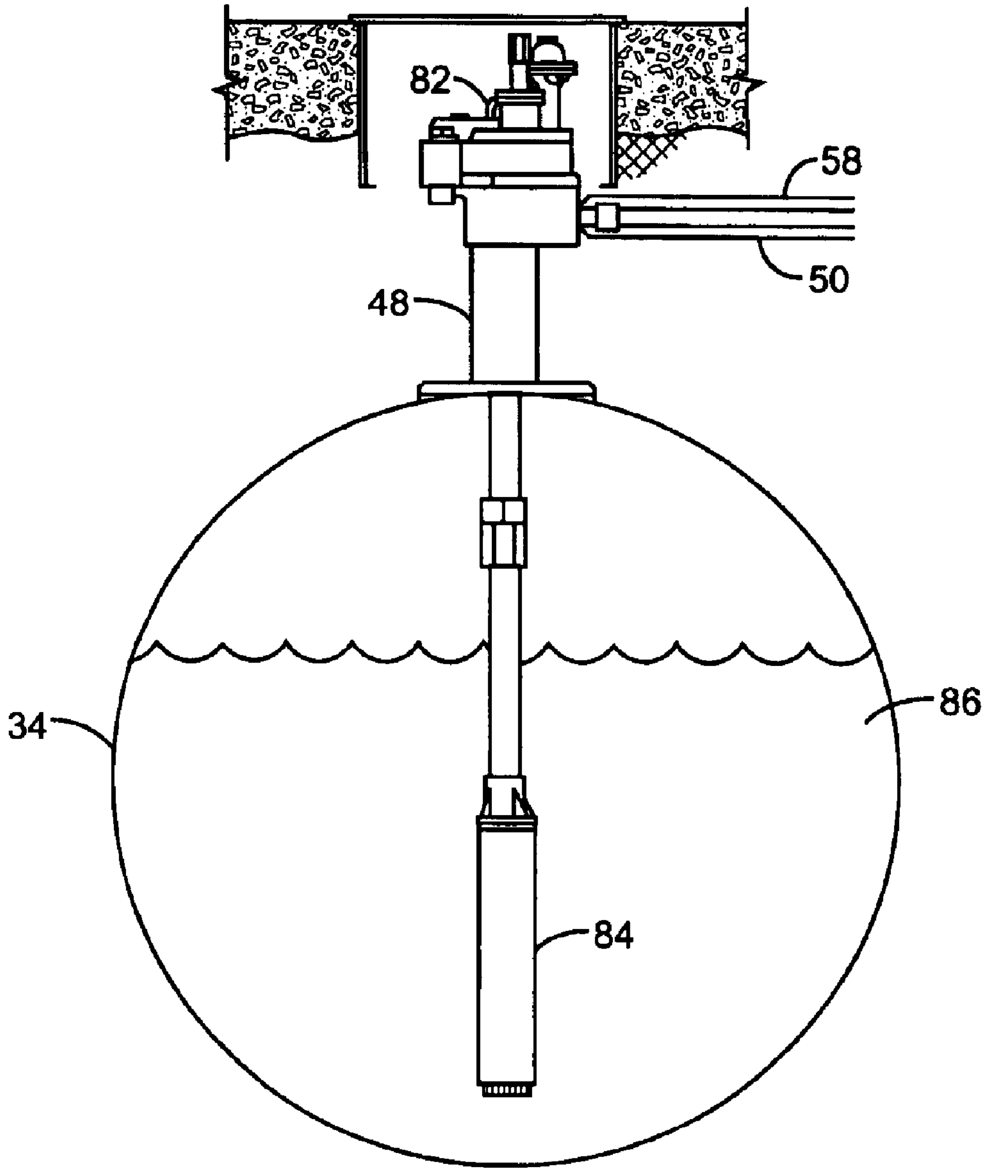
FIG. 5 illustrates a first embodiment of a fuel return to underground storage tank arrangement.

A first embodiment of the connection to the daisy chaining double-walled pipe 50 to the underground storage tank 34 is illustrated in FIG. 5. The daisy chaining double-walled pipe 50 connects to a distribution head 82, which in turn connects to the double-walled pipe 48. Portions of the submersible turbine pump, such as the pump and the motor, may be contained within the distribution head 82. The boom 84 of the submersible turbine pump is positioned within the underground storage tank 34, preferably below the level of fuel 86 within the underground storage tank 34. For a more complete exploration of the submersible turbine pump, reference is made to U.S. Pat. No. 6,223,765 assigned to Marley Pump Company, which is incorporated by reference in its entirety, and the product exemplifying the teachings of the patent explained in *Quantum Submersible Pump Manual: Installation and Operation*, also produced by the Marley Pump Company, also incorporated by reference in its entirety. In this embodiment, fuel captured by the outer wall 58 is returned to the distribution head 82 such as through a vacuum or by gravity feeds. A valve (not shown) may allow the fuel to pass into the distribution head 82 and thereby be connected to the double-walled pipe 48 for return to the underground storage tank 34. The structure of the distribution head in the '765 patent is well suited for this purpose having multiple paths by which fuel may be returned to the outer wall of the double-walled pipe that connects the distribution head 82 to the submersible turbine pump 84.

Figure 6:
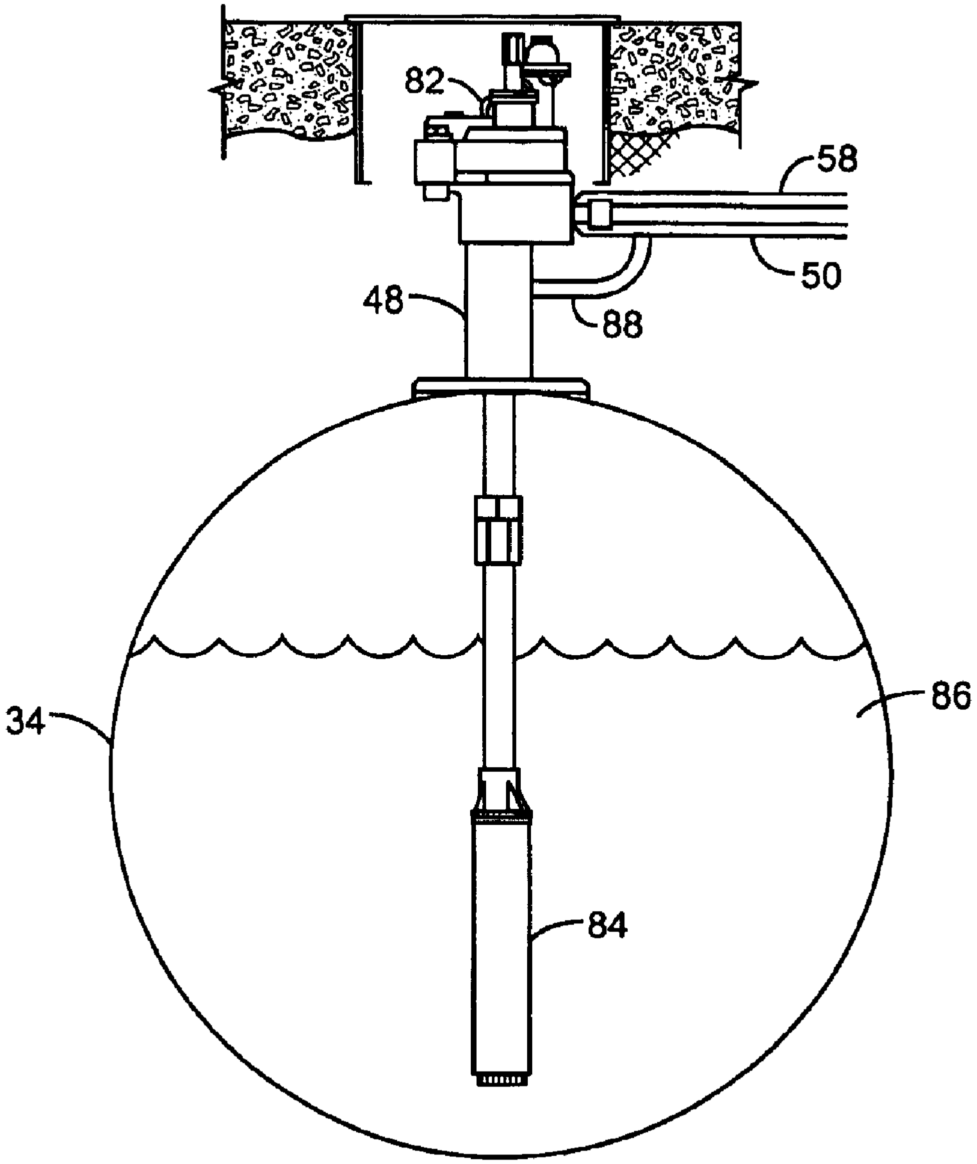
FIG. 6 illustrates a second embodiment of a fuel return to underground storage tank arrangement.

A second embodiment of the connection of the daisy chaining double-walled pipe 50 to the underground storage tank 34 is illustrated in FIG. 6. The distribution head 82 is substantially identical to the previously incorporated U.S. Pat. No. 6,223,765. The daisy chaining double-walled pipe 50, however, comprises a fluid connection 88 to the double-walled pipe 48. This allows the fuel in the outer wall 58 to drain directly to the underground storage tank 34, instead of having to provide a return path through the distribution head 82. Further, the continuous fluid connection from the underground storage tank 34 to the outer wall 58 causes any vacuum present in the underground storage tank 34 to also be existent in the outer wall 58 of the daisy chaining double-walled pipe 50. This vacuum may help drain the fuel back to the underground storage tank 34. In an exemplary embodiment, the fluid connection 88 may also be double-walled so as to comply with any appropriate regulations.

Figure 7:
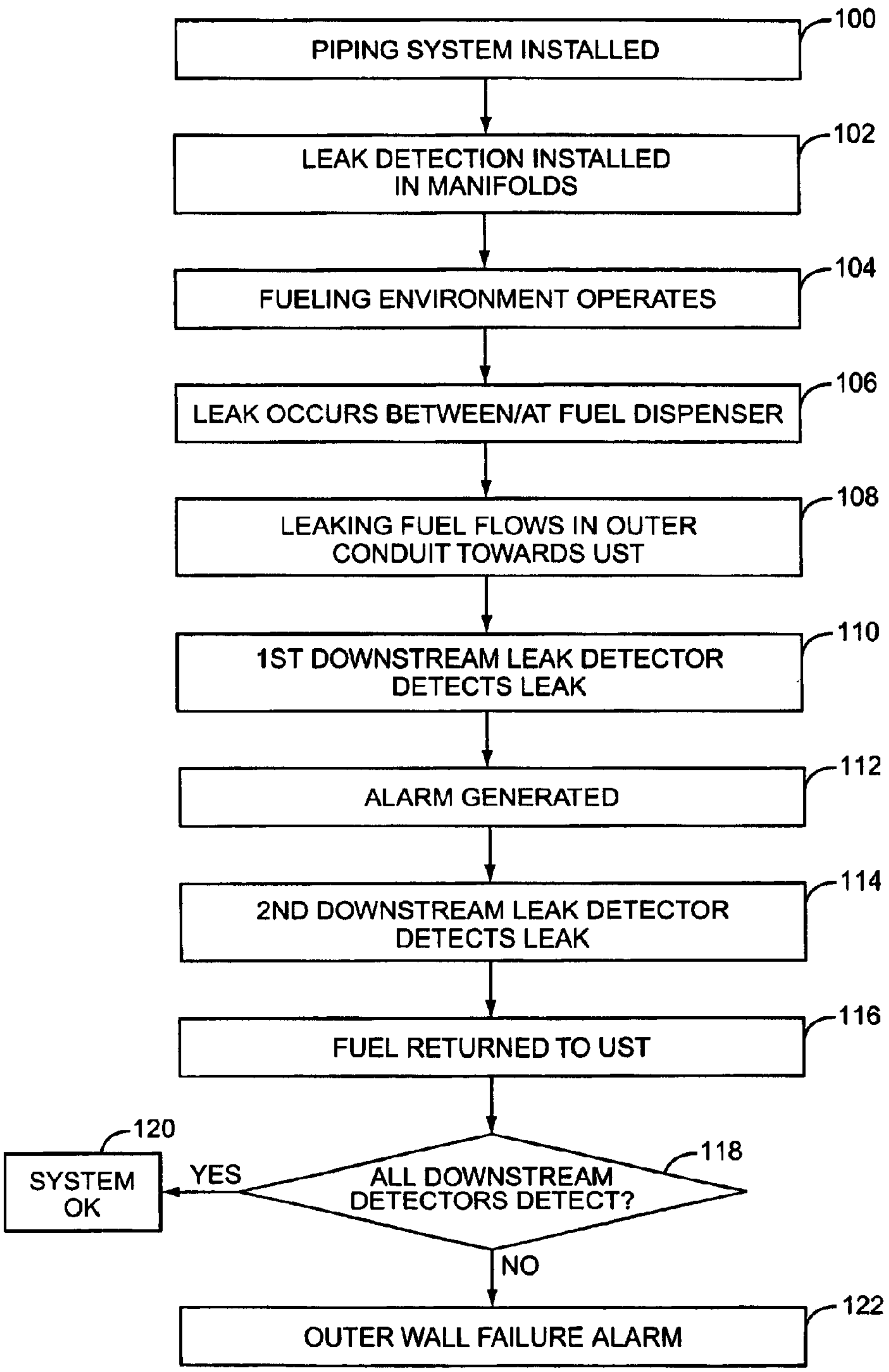
FIG. 7 illustrates a flow chart showing the leak detection functionality of the present invention.

FIG. 7 illustrates the methodology of the parent invention. During new construction of the fueling environment 10, or perhaps when adding the present invention to an existing fueling environment 10, the daisy chained piping system according to the present invention is installed (block 100). The pipe connection between the first fuel dispenser $32_1$ and the underground storage tank 34 may, in an exemplary embodiment, be sloped such that gravity assists the drainage from the fuel dispenser 32 to the underground storage tank 34. The leak detection system, and particularly the leak detection probes 64, are installed in the manifolds 52 of the fuel dispensers 32 (block 102). Note that the leak detection probes 64 may be installed during construction of the fuel dispensers 32 or retrofit as needed. In any event, the leak detection probes 64 may communicate with the site communicators such as the site controller 26 or the tank monitor 36 as needed or desired. This communication may be for alarm purposes, calibration purposes, testing purposes or the like as needed or desired. Additionally, this communication may pass through the site communicator to a remote location if needed. Further, note that additional leak detectors (not shown) may be installed for redundancies and/or positioned in the sumps of the fuel dispensers 32. Still further, leak detection programs may be existent to determine if the underground storage tank 34 is leaking. These additional leak detection devices may likewise communicate with the site communicator as needed or desired.

The fueling environment 10 operates as is conventional, with fuel being dispensed to vehicles, vapor recovered, consumers interacting with the points of sale, and the operator generating revenue (block 104). At some point, a leak occurs between two fuel dispensers $32_x$ and $32_{x-1}$. Alternatively, the leak may occur at a fuel dispenser $32_{x-1}$ (block 106). The leaking fuel flows towards the underground storage tank 34 (block 108), as a function of the vacuum existent in the outer wall 58, via gravity or the like. The leak is detected at the first downstream leak detection probe 64 (block 110). Thus, in the two examples, the leak would be detected by the leak detection probe 64 positioned within the fuel dispenser $32_{x-1}$. This helps in pinpointing the leak. An alarm may be generated (block 112). This alarm may be reported to the site controller 26, the tank monitor 36 or other location as needed or desired.

A second leak detection probe 64, positioned downstream of the first leak detection probe 64 in the fuel dispenser $32_{x-1}$, will then detect the leaking fuel as it flows past the second leak detection probe 64 (block 114). This continues, with the leak detection probe 64 in each fuel dispenser 32 downstream of the leak detecting the leak until fuel dispenser $32_1$ detects the leak. The fuel is then returned to the underground storage tank 34 (block 116).

If all downstream leak detection probes 64 detect the leak at query block 118, that is indicative that the system works (block 120). If a downstream leak detection probe 64 fails to detect the leak during the query of block 118, then there is potentially a failure in the outer wall 58 and an alarm may be generated (block 122). Further, if the leak detection probes 64 associated with fuel dispensers $32_{x-1}$ and $32_{x-1}$ both detect the leak, but the leak detection probe 64 associated with the fuel dispenser $32_x$ does not detect a leak, that is indicative of a sensor failure and a second type of alarm may be generated.

Additionally, once a leak is detected and the alarm is generated, the fueling environment 10 may shut down so that clean up and repair can begin. However, if the double-walled piping system works the way it should, the only repair will be to the leaking section of inner pipe within the daisy chaining double-walled pipe 50 or the leaking fuel dispenser 32. Any fuel caught by the outer wall 58 is returned for reuse, thus saving on clean up.

As an alternative to draining the fuel back to the underground storage tank 34, the present invention also provides for the situation where the fuel drains to a sump associated with the submersible turbine pump. This alternative has two embodiments, one in which the sump is positioned in the distribution head 82 of the submersible turbine pump (illustrated in FIG. 8) and one in which the sump is positioned outside the distribution head 82 of the submersible turbine pump (illustrated in FIG. 9). In both embodiments, there must be some mechanism to encourage proper draining. This may be a gravity feed through sloped pipes, a vacuum, a lower pressure, or the like. These and other techniques known to those of ordinary skill the art may be used to cause the fuel that has leaked into the outer annular space of the double-walled piping to flow back to the sump. Likewise, in both embodiments, the daisy chain piping arrangement and the leak detection sensor array previously described are readily adapted for use.

Figure 8:
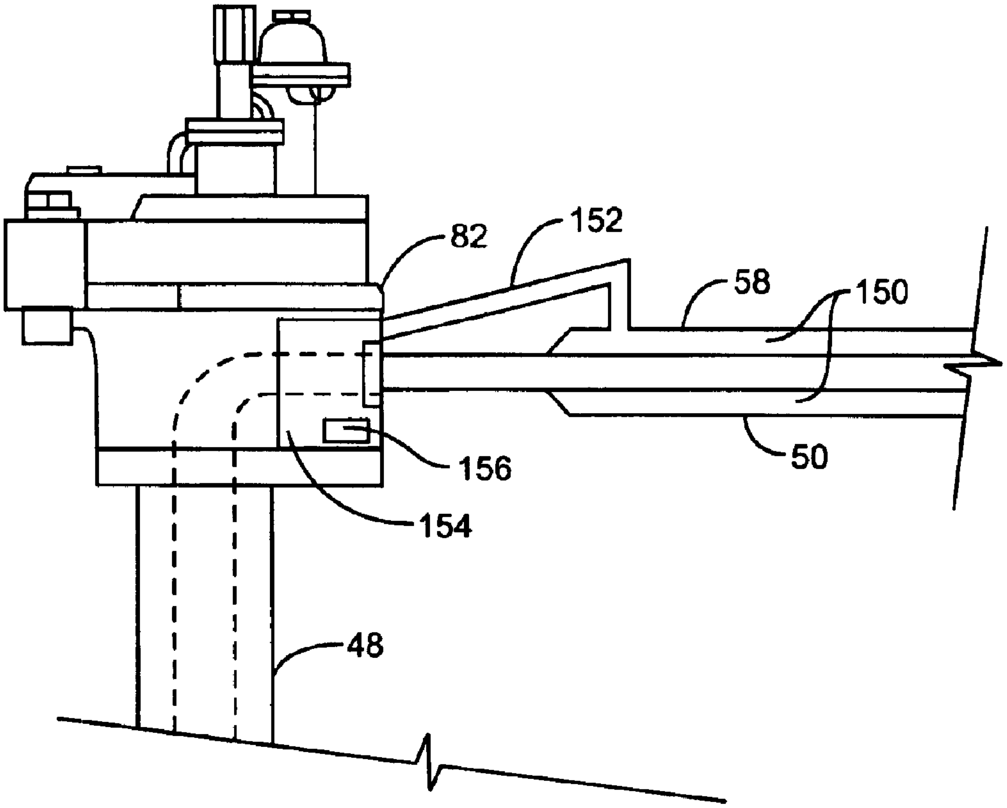
FIG. 8 illustrates an alternate embodiment wherein the fuel return terminates in the head of the submersible turbine pump.

In the first embodiment, illustrated in FIG. 8, the daisy chaining double-walled pipe 50 has an outer annular path 150 formed by outer wall 58. A bypass tube 152 fluidly couples the outer annular path 150 to a sump chamber 154 where fuel captured by the double-walled piping may collect. A pressure sensor 156 may be positioned within the sump chamber 154 to detect any pressure changes within the outer portion of the daisy chaining double-walled piping 50. This pressure change may be indicative of a leak as is described in U.S. patent application Ser. No. 10/238,822, entitled SECONDARY CONTAINMENT SYSTEM AND METHOD, filed 10 Sep. 2002, which is hereby incorporated by reference in its entirety.

Figure 9:
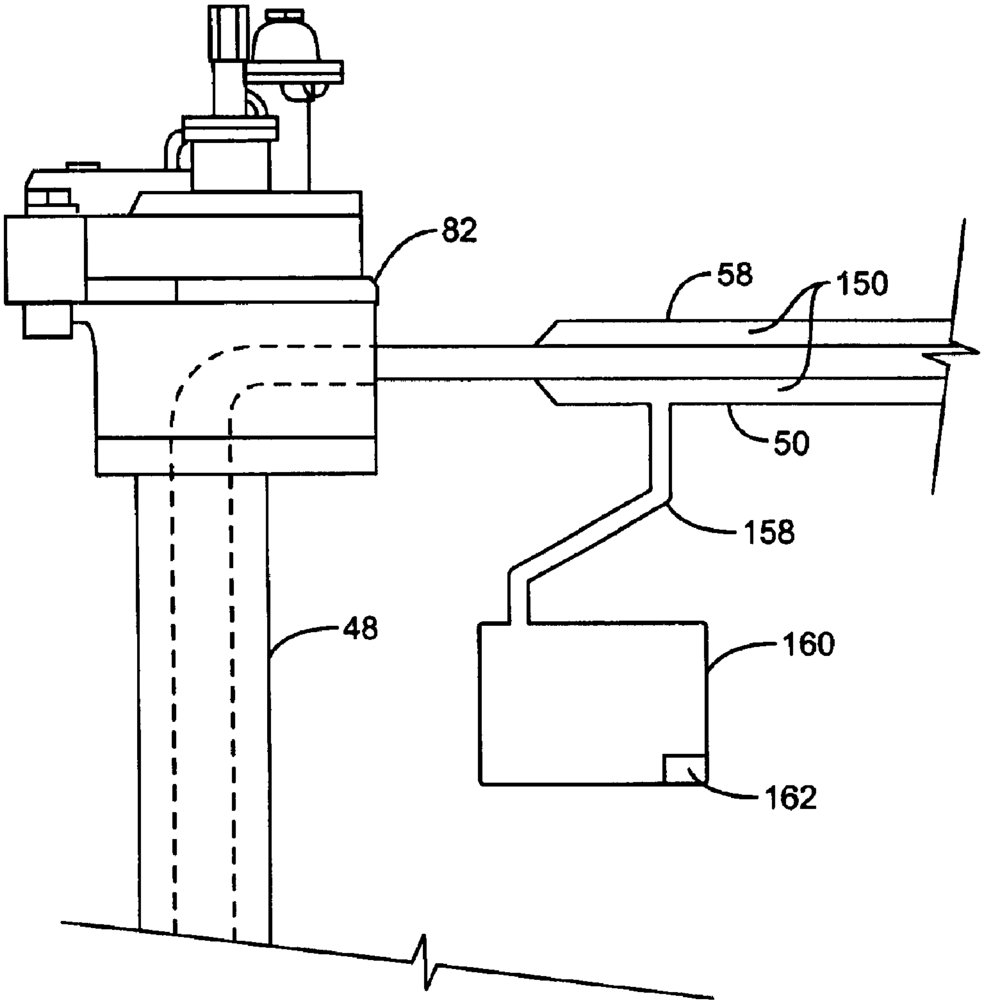
FIG. 9 illustrates an alternate embodiment wherein the fuel return terminates in a sump after passing through the head of the submersible turbine pump.

In the second embodiment, illustrated in FIG. 9, the daisy chaining double-walled pipe 50 terminates the outer annular path 150 prior to reaching the interior of the distribution head 82 and drains via a bypass tube 158 to an external sump chamber 160. External sump chamber 160 may have a pressure sensor 162 positioned therein similar to pressure sensor 156.

Those skilled in the art will recognize improvements and modifications to the preferred embodiments of the present invention. All such improvements and modifications are considered within the scope of the concepts disclosed herein and the claims that follow.

What is claimed is:

1. A method of detecting a leak in a fueling distribution system in a retail fuel dispensing environment with a fuel dispenser, said method comprising:

dispensing fuel throughout the retail fuel dispensing environment in an inner conduit of a double-walled conduit;

capturing time leak from said inner conduit with an outer conduit of said double-walled conduit;

returning fuel leaked into said outer conduit to a sump positioned proximate a submersible turbine pump in the retail fuel dispensing environment;

detecting the leak at said sump; and routing leaked fuel through a bypass line to said sump.

2. The method of claim 1, further comprising generating an alarm when the leak is detected.

3. The method of claim 1, farther comprising communicating a leak condition to a site communicator.

4. The method of claim 1, wherein returning fuel leaked into said outer conduit to the sump comprises facilitating said returning via gravity.

5. The method of claim 1, wherein returning fuel leaked into said outer conduit to the sump comprises facilitating said returning via a vacuum assist.

6. The method of claim 1, wherein dispensing fuel throughout the retail fuel dispensing environment comprises dispensing fuel throughout the retail fuel dispensing environment through a main and branch piping system.

7. The method of claim 1, further comprising terminating the outer conduit of said double-walled conduit proximate prior to reaching a distribution head of the submersible turbine pump.

8. The method of claim 1, further comprising isolating said outer conduit from a sump associated with the fuel dispenser.

9. The method of claim 1, further comprising connecting a plurality of fuel dispensers in a daisy chained arrangement to dispense fuel throughout the retail fuel dispensing environment.

10. The method of claim 9, further comprising returning the fuel leaked to the sump through a subset of said plurality of fuel dispensers.

11. The method of claim 1, wherein returning fuel leaked into said outer conduit to a sump comprises returning the fuel leaked into said outer conduit to a sump chamber positioned within a distribution head of said submersible turbine pump.

12. The method of claim 11, further comprising positioning a pressure sensor within said sump chamber.

13. The method of claim 1, wherein returning fuel leaked into said outer conduit to a sump comprises returning the fuel leaked into said outer conduit to a sump chamber positioned proximate a distribution head of said submersible turbine pump.

14. The method of claim 13, further comprising positioning a pressure sensor within said sump chamber.

15. A method of detecting a leak in a fueling distribution system in a retail fuel dispensing environment with a fuel dispenser, said method comprising:

connecting a plurality of fuel dispensers in a daisy chained arrangement;

dispensing fuel throughout the retail fuel dispensing environment in an inner conduit of a double-walled conduit;

capturing the leak from said inner conduit with an outer conduit of said double-walled conduit;

returning fuel leaked into said outer conduit to a sump positioned proximate a submersible turbine pump in the retail fuel dispensing environment;

detecting the leak at said sump; and returning the fuel leaked to an underground storage tank through a subset of said plurality of fuel dispensers.

16. The method of claim 15, further comprising generating an alarm when the leak is detected.

17. The method of claim 15, wherein returning fuel leaked into said outer conduit to a sunup comprises returning the fuel leaked into said outer conduit to a sump chamber positioned within a distribution head of said submersible turbine pump.

18. The method of claim 15, wherein returning fuel leaked into said outer conduit to a sump comprises returning the fuel leaked into said outer conduit to a sump chamber positioned proximate a distribution head of said submersible turbine pump.

19. The method of claim 15, further comprising positioning a pressure sensor within said sump.

20. The method of claim 15, further comprising communicating a leak condition to a site communicator.

21. The method of claim 15, wherein returning fuel leaked into said outer conduit to the sump comprises facilitating said returning via gravity.

22. The method of claim 15, wherein returning fuel leaked into said outer conduit to the sump comprises facilitating said returning via a vacuum assist.

23. The method of claim 15, further comprising terminating the outer conduit of said double-walled conduit proximate prior to reaching a distribution head of the submersible turbine pump.

24. The method of claim 15, further comprising isolating said outer conduit from a sump associated with the fuel dispenser selected from said plurality of fuel dispensers.

* * * * *

UNITED STATES PATENT AND TRADEMARK OFFICE

CERTIFICATE OF CORRECTION

PATENT NO. : 6,935,161 B2
DATED : August 30, 2005
INVENTOR(S) : Ray J. Hutchinson It is certified that error appears in the above-identified patent and that said Letters Patent is hereby corrected as shown below:

Column 9,
Line 7, change "time" to -- the --.
Line 16, change "farther" to -- further --.

Column 10,
Line 24, change "sunup" to -- sump --.

Signed and Sealed this

Eighth Day of November, 2005

JON W. DUDAS
*Director of the United States Patent and Trademark Office*